(12) United States Patent
Kishor et al.

(10) Patent No.: US 12,047,336 B1
(45) Date of Patent: Jul. 23, 2024

(54) SYSTEMS AND METHODS FOR INCLUSIVE CONVERSATIONAL ARTIFICIAL INTELLIGENCE

(71) Applicant: Optum, Inc., Minnetonka, MN (US)

(72) Inventors: Nand Kishor, Greater Noida (IN); Tiasa Mukherjee, Bengaluru (IN)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/302,175

(22) Filed: Apr. 18, 2023

(51) Int. Cl.
*H04L 51/02* (2022.01)
*G06F 40/263* (2020.01)

(52) U.S. Cl.
CPC ............ *H04L 51/02* (2013.01); *G06F 40/263* (2020.01)

(58) Field of Classification Search
None
See application file for complete search history.

(56) References Cited

U.S. PATENT DOCUMENTS

| | | | |
|---|---|---|---|
| 10,491,558 B2 | 11/2019 | Morrison | |
| 10,666,583 B2 | 5/2020 | Yao | |
| 10,666,594 B2 | 5/2020 | Pfriem | |
| 10,672,397 B2 | 6/2020 | Lee | |
| 10,747,823 B1 | 8/2020 | Birnbaum | |
| 10,762,113 B2 | 9/2020 | Jia | |
| 11,258,735 B2 | 2/2022 | Perazzo | |
| 11,402,976 B1* | 8/2022 | Palamadai | G06F 3/0484 |
| 11,741,945 B1* | 8/2023 | Sullivan | G06N 20/00 704/270.1 |
| 2013/0174034 A1 | 7/2013 | Brown et al. | |
| 2015/0186156 A1 | 7/2015 | Brown et al. | |
| 2018/0314689 A1 | 11/2018 | Wang et al. | |
| 2019/0156222 A1 | 5/2019 | Emma | |
| 2020/0104723 A1* | 4/2020 | Reissner | G06F 8/38 |
| 2020/0134022 A1* | 4/2020 | Millius | G06F 40/56 |

FOREIGN PATENT DOCUMENTS

JP 4316472 B2 * 8/2009

OTHER PUBLICATIONS

Translation of JP-4316472-B2 (Year: 2009).*

* cited by examiner

*Primary Examiner* — Scott B Christensen
(74) *Attorney, Agent, or Firm* — Bookoff McAndrews, PLLC

(57) ABSTRACT

Systems and methods for dynamically customizing a virtual assistant are disclosed. The systems and methods can receive information associated with a conversation involving the virtual assistant; determine whether a channel switching condition for switching the conversation from a first channel to a second channel is satisfied, based on the information associated with the conversation; determine whether a language switching condition for switching the conversation from a first language to a second language is satisfied, based on the information associated with the conversation; determine whether a configuration switching condition for switching a first configuration of the virtual assistant to a second configuration of the virtual assistant is satisfied, based on the information associated with the conversation; and perform an action based on at least one of the determinations.

20 Claims, 6 Drawing Sheets

US 12,047,336 B1

SYSTEMS AND METHODS FOR INCLUSIVE CONVERSATIONAL ARTIFICIAL INTELLIGENCE

TECHNICAL FIELD

The present disclosure relates to systems and methods for channel, language, and configuration support for virtual assistants. More specifically, the present disclosure relates to systems and methods for adjusting a channel of a conversation between a user and a virtual assistant, adjusting a language of the conversation, and/or adjusting a configuration of the virtual assistant, based on information associated with the conversation.

BACKGROUND

A "virtual assistant" is a software application that is configured to perform tasks or services for a user based on user inputs (e.g., commands, inquiries, or the like) from the user. A virtual assistant can also be referred to as an "intelligent virtual assistant," an "intelligent personal agent," a "chatbot," or the like.

A user can utilize a user device (e.g., a smartphone, a computer, a smart speaker, a wearable device, or the like) to access a virtual assistant and conduct a conversation with the virtual assistant. The virtual assistant can be configured to utilize a particular channel (e.g., text or voice), to communicate in a particular language (e.g., English, Spanish, etc.), and to communicate using a particular configuration (e.g., speech speed, accent, volume, or the like).

In some cases, a more suitable channel for the conversation, language of the conversation, and/or configuration of the virtual assistant may exist. However, the virtual assistant may be confined to communicating with the user in association with the initial channel, the initial language, and/or the initial configuration. In other words, the virtual assistant might not be configured to adjust the initial channel of the conversation to another channel, adjust the initial language of the conversation to another language, and/or adjust the initial configuration of the virtual assistant to another configuration. Accordingly, communication between the user and the virtual assistant can be difficult, inefficient, impractical, or impossible. As such, the conversation may take longer than expected, the virtual assistant may not provide a response in an appropriate time frame, or the virtual assistant might not provide a response. In other cases, the user may be required to initiate a new conversation via a different channel. In these cases, the processing resources of devices that implement virtual assistants might be consumed. The foregoing problems are further exacerbated for users with certain physical, neurological, and/or cognitive disorders, such as dysgraphia, attention and concentration disorders, dyscalculia, memory disorders, dyslexia etc.

Unless otherwise indicated herein, the materials described in this section are not prior art to the claims in this application and are not admitted to be prior art, or suggestions of the prior art, by inclusion in this section.

SUMMARY

According to some embodiments, computer-implemented method for dynamically customizing a virtual assistant can include receiving, by one or more processors, information associated with a conversation involving the virtual assistant; determining, by the one or more processors, whether a channel switching condition for switching the conversation from a first channel to a second channel is satisfied, based on the information associated with the conversation; determining, by the one or more processors, whether a language switching condition for switching the conversation from a first language to a second language is satisfied, based on the information associated with the conversation; determining, by the one or more processors, whether a configuration switching condition for switching a first configuration of the virtual assistant to a second configuration of the virtual assistant is satisfied, based on the information associated with the conversation; and performing an action based on at least one of determining whether the channel switching condition is satisfied, determining whether the language switching condition is satisfied, or determining whether the configuration switching condition is satisfied.

According to some embodiments, system for dynamically customizing a virtual assistant can include one or more storage devices each configured to store instructions; and one or more processors configured to execute the instructions to perform operations comprising: receiving information associated with a conversation involving a virtual assistant; determining whether a channel switching condition for switching the conversation from a first channel to a second channel is satisfied, based on the information associated with the conversation; determining whether a language switching condition for switching the conversation from a first language to a second language is satisfied, based on the information associated with the conversation; determining whether a configuration switching condition for switching a first configuration of the virtual assistant to a second configuration of the virtual assistant is satisfied, based on the information associated with the conversation; and performing an action based on at least one of: determining whether the channel switching condition is satisfied, determining whether the language switching condition is satisfied, or determining whether the configuration switching condition is satisfied.

According to some embodiments, non-transitory computer-readable medium can store instructions that, when executed by one or more processors, cause the one or more processors to perform operations for dynamically customizing a virtual assistant including receiving information associated with a conversation involving the virtual assistant; determining whether a channel switching condition for switching the conversation from a first channel to a second channel is satisfied, based on the information associated with the conversation; determining whether a language switching condition for switching the conversation from a first language to a second language is satisfied, based on the information associated with the conversation; determining whether a configuration switching condition for switching a first configuration of the virtual assistant to a second configuration of the virtual assistant is satisfied, based on the information associated with the conversation; and performing an action based on at least one of determining whether the channel switching condition is satisfied, determining whether the language switching condition is satisfied, or determining whether the configuration switching condition is satisfied.

Some embodiments herein provide systems and methods that receive information associated with a conversation involving a virtual assistant, and selectively adjust a channel of the conversation, a language of the conversation, and/or a configuration of the virtual assistant based on whether respective switching conditions are satisfied.

The switching could improve the conversation by improving the user experience, improving user sentiment, reducing the amount of time needed for the conversation, reducing the amount of time needed to deliver a particular outcome to the user, reducing the amount of computational resources consumed by the user device or the platform, reducing the number of repeat requests by the user, reducing the need of the user to initiate a separate conversation, or the like. Accordingly, some embodiments herein improve the technical field associated with virtual assistants and improve computing devices associated with implementing virtual assistants by providing more efficient and more effective virtual assistants.

It can be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various example embodiments and together with the description, serve to explain the principles of the disclosed embodiments.

DETAILED DESCRIPTION

Figure 1:
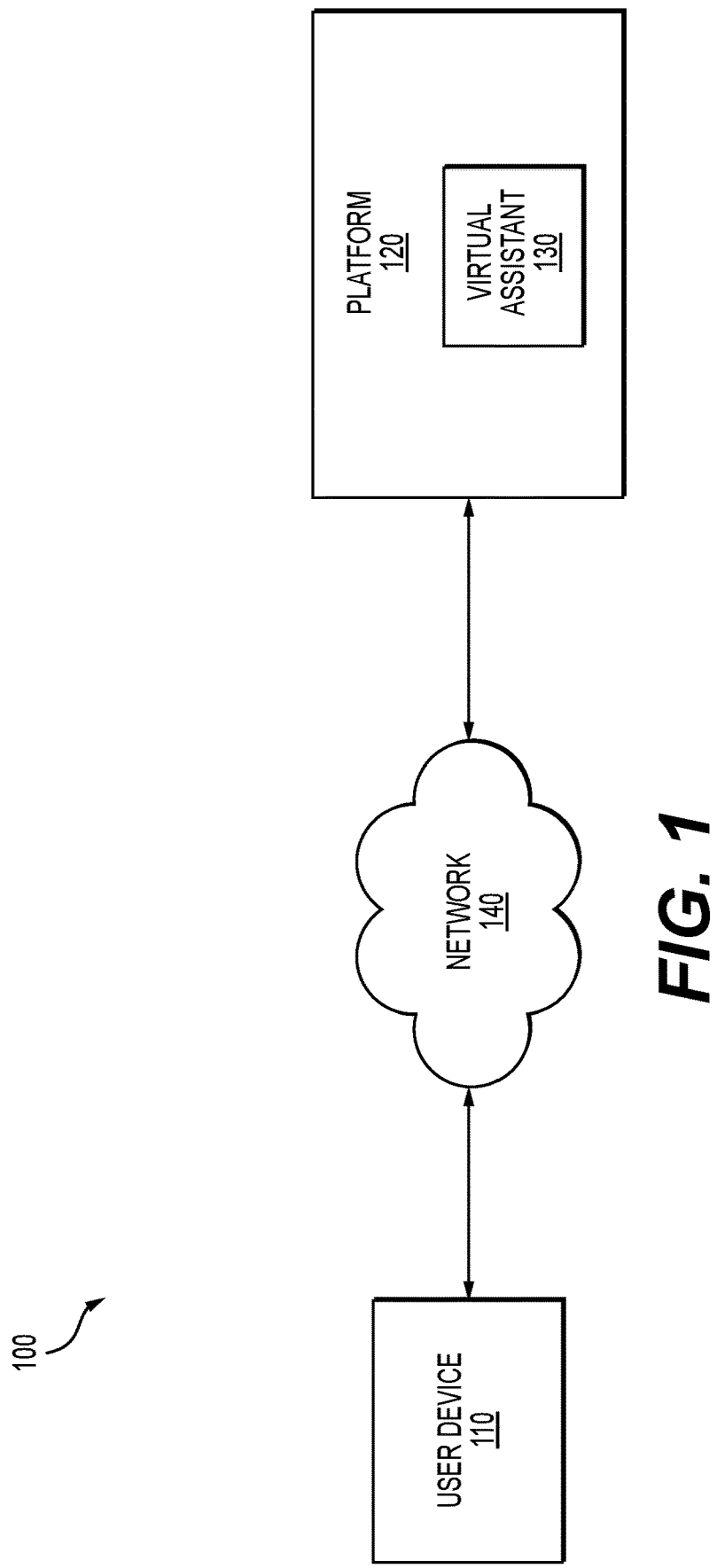
FIG. 1 is a diagram of an example environment for systems and methods for channel, language, and configuration support for virtual assistants, in accordance with some embodiments of the present disclosure.

FIG. 1 is a diagram of an example environment for systems and methods for channel, language, and configuration support for virtual assistants. As shown in FIG. 1, the system 100 can include a user device 110, a platform 120, a virtual assistant 130, and a network 140.

The user device 110 can include a device configured to permit a user to access virtual assistant 130. For example, the user device 110 can be a smartphone, a desktop computer, a laptop computer, a wearable device, or the like.

The platform 120 can include a device configured to receive information associated with a conversation involving the virtual assistant 130, determine whether a channel switching condition, a language switching condition, and a configuration switching condition are satisfied, and perform an action. For example, the platform 120 can be a server, a cloud server, or the like.

The virtual assistant 130 can include an application configured to conduct a conversation with a user of the user device 110, such as by responding to inquiries, searching for information, executing commands, or the like. For example, the virtual assistant can be a virtual assistant, a virtual agent, an intelligent virtual assistant, an intelligent personal agent, a chatbot, or the like. In some implementations, the virtual assistant 130 can be stored by the platform 120. Additionally, or alternatively, the virtual assistant 130 can be entirely, or partially, stored by the user device 110.

The network 140 can include a network configured to permit communication between the user device 110 and the platform 120. For example, the network 140 can be a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of the devices of the system 100 shown in FIG. 1 are provided as an example. In practice, the system 100 can include additional devices, fewer devices, different devices, or differently arranged devices than those shown in FIG. 1. Additionally, or alternatively, a set of devices (e.g., one or more devices) of the system 100 can perform one or more functions described as being performed by another set of devices of the system 100.

Figure 2:
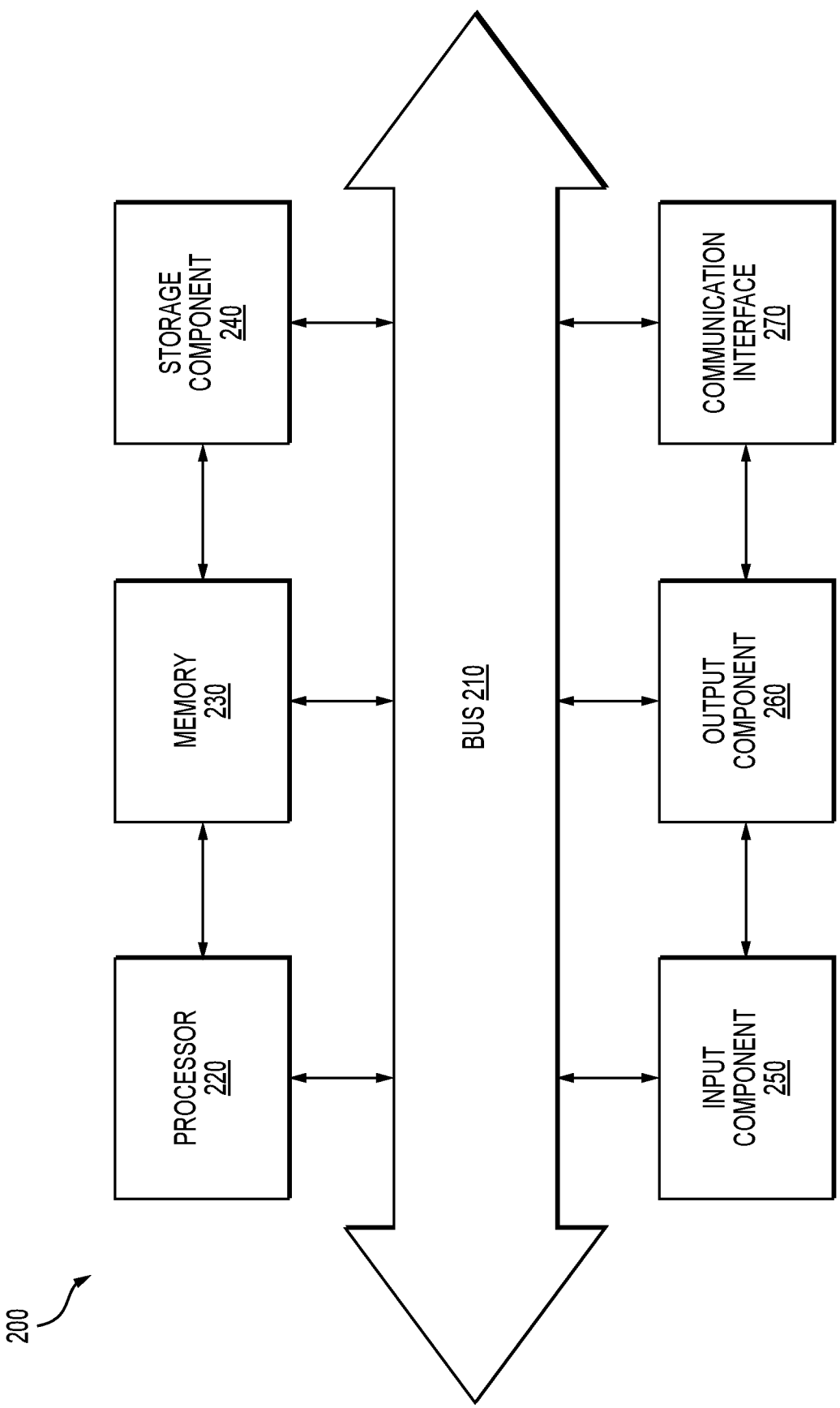
FIG. 2 is a diagram of example components of one or more devices of FIG. 1, in accordance with some embodiments of the present disclosure.

FIG. 2 is a diagram of example components of one or more devices of FIG. 1. The device 200 can correspond to the use device 110, the platform 120, and/or the virtual assistant 130. As shown in FIG. 2, the device 200 can include a bus 210, a processor 220, a memory 230, a storage component 240, an input component 250, an output component 260, and a communication interface 270.

The bus 210 includes a component that permits communication among the components of the device 200. The processor 220 can be implemented in hardware, firmware, or a combination of hardware and software. The processor 220 can be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component.

The processor 220 can include one or more processors capable of being programmed to perform a function. The memory 230 can include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 can store information and/or software related to the operation and use of the device 200. For example, the storage component 240 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 can include a component that permits the device 200 to receive information, such as via user input (e.g., a touch screen display, a keyboard, a keypad, a mouse, a button, a switch, and/or a microphone for receiving the reference sound input). Additionally, or alternatively, the input component 250 can include a sensor for sensing information (e.g., a global positioning system (GPS) component, an accelerometer, a gyroscope, and/or an actuator). The output component 260 can include a component that provides output information from the device 200 (e.g., a display, a speaker for outputting sound at the output sound level, and/or one or more light-emitting diodes (LEDs)).

The communication interface 270 can include a transceiver-like component (e.g., a transceiver and/or a separate receiver and transmitter) that enables the device 200 to communicate with other devices, such as via a wired connection, a wireless connection, or a combination of wired and wireless connections. The communication interface 270 can permit the device 200 to receive information from another device and/or provide information to another device. For example, the communication interface 270 can include an Ethernet interface, an optical interface, a coaxial interface, an infrared interface, a radio frequency (RF) interface, a universal serial bus (USB) interface, a Wi-Fi interface, a cellular network interface, or the like.

The device 200 can perform one or more processes described herein. The device 200 can perform these processes based on the processor 220 executing software instructions stored by a non-transitory computer-readable medium, such as the memory 230 and/or the storage component 240. A computer-readable medium can be defined herein as a non-transitory memory device. A memory device can include memory space within a single physical storage device or memory space spread across multiple physical storage devices.

The software instructions can be read into the memory 230 and/or the storage component 240 from another computer-readable medium or from another device via the communication interface 270. When executed, the software instructions stored in the memory 230 and/or the storage component 240 can cause the processor 220 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of the components shown in FIG. 2 are provided as an example. In practice, the device 200 can include additional components, fewer components, different components, or differently arranged components than those shown in FIG. 2. Additionally, or alternatively, a set of components (e.g., one or more components) of the device 200 can perform one or more functions described as being performed by another set of components of the device 200.

Figure 3:
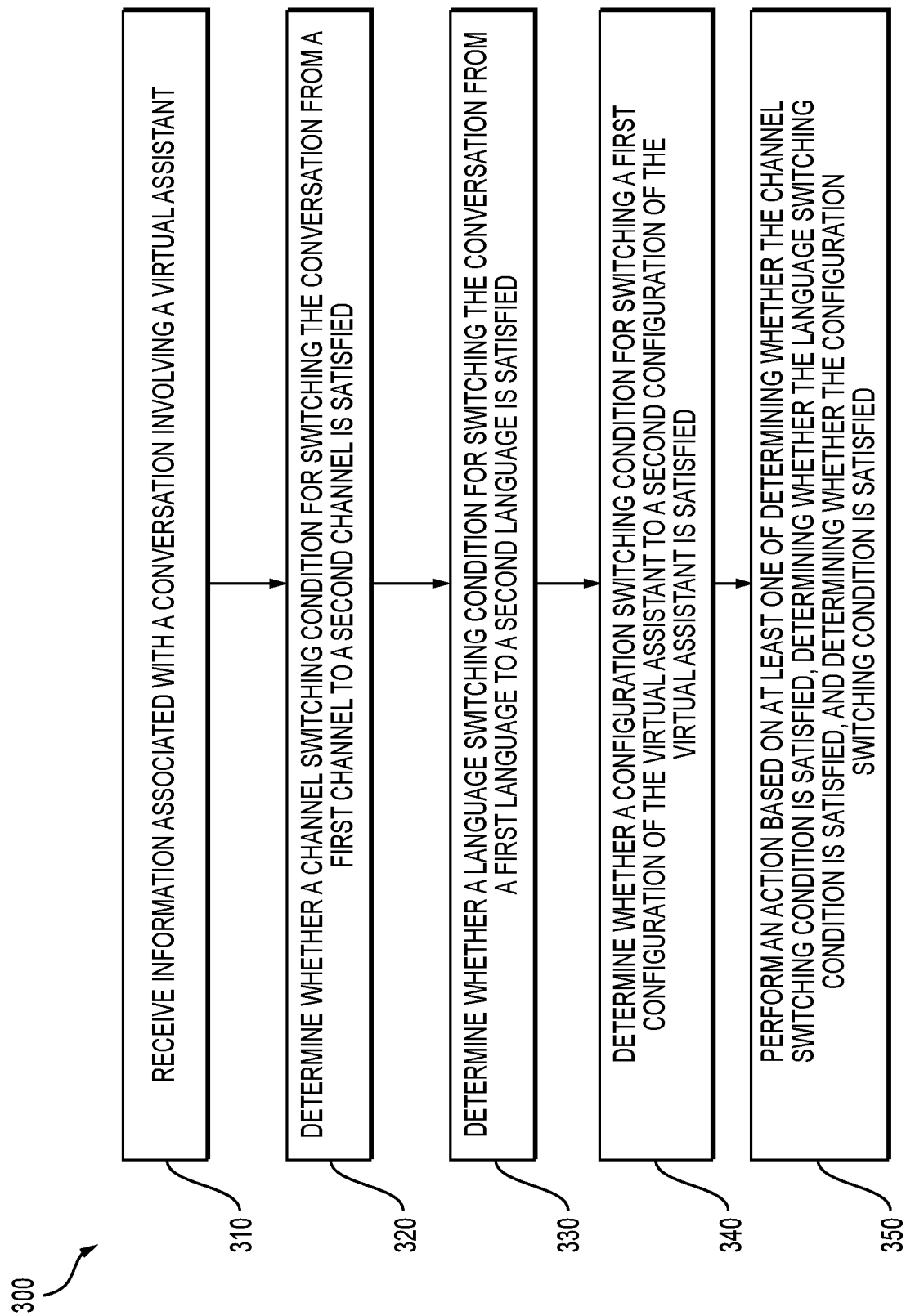
FIG. 3 is a flowchart of an example process for providing channel, language, and configuration support for virtual assistants, in accordance with some embodiments of the present disclosure.

FIG. 3 is a flowchart of an example process for providing channel, language, and configuration support for virtual assistants.

As shown in FIG. 3 at block 310, the process 300 can include receiving information associated with a conversation involving a virtual assistant. For example, the platform 120 can receive information associated with a conversation involving the virtual assistant 130 and a user that is communicating with the virtual assistant via the user device 110.

In some implementations, the platform 120 can store the virtual assistant 130, and the user device 110 can access the virtual assistant 130 via a client application of the user device 110. In this case, the platform 120 can receive the information associated with the conversation based on the user device 110 accessing the virtual assistant 130. Alternatively, the user device 110 can store the virtual assistant 130. In this case, the platform 120 can receive the information associated with the conversation from the user device 110.

In some implementations, the information associated with the conversation can identify an initial channel of the conversation, an initial language of the conversation, and an initial configuration of the virtual assistant 130. The channel can be any type of channel by which a user can communicate with the virtual assistant 130. For example, the channel can be text, voice, video, or the like. The language can be any type of language by which a user can communicate with the virtual assistant 130. For example, the language can be English, Spanish, Indian, French, Korean, etc. The configuration can be any type of configuration of the virtual assistant 130. For example, the configuration can be a volume, a speech speed, a voice, an accent, a dialect, a lexicon, or the like.

In some implementations, the information associated with the conversation can include information that identifies the user. For example, the information can be a name, an identifier, a username, an account identifier, or the like. Additionally, or alternatively, the information associated with the conversation can include information that identifies the user device 110. For example, the information can include a device identifier, a model identifier, an Internet protocol (IP) address, a media access control (MAC) address, or the like.

In some implementations, the information associated with the conversation can include demographic information of the user. For example, the information can include an age, a race, a sex, an education, an income, an employment, or the like, of the user. Additionally, or alternatively, the information associated with the conversation can include location information of the user. For example, the information can include a city, a state, a country, a geographic area, or the like.

In some implementations, the information associated with the conversation can include information that identifies settings of the user. For example, the information can identify a preferred channel, a preferred language, a preferred configuration, or the like.

In some implementations, the information associated with the conversation can include information that identifies previous conversation information of the user. For example, the information can identify content of previous conversations of the user, previous settings of the virtual assistant 130, or the like.

In some implementations, the information associated with the conversation can include temporal information of the conversation. For example, the information can include a time, a date, or the like.

In some implementations, the information associated with the conversation can include information that identifies content of the conversation. For example, the information can include text of the conversation, audio of the conversation, video of the conversation, or the like. In this case, the information can include user inputs, responses of the virtual assistant 130, or the like. Additionally, or alternatively, the information can identify a duration of the conversation, a number of user inputs, a number of responses of the virtual assistant 130, or the like.

In some implementations, the information associated with the conversation can include information that identifies a typing speed of the user such as when a user input is a text input. For example, the information can include a typing speed, a typing indicator start timestamp, a typing indicator stop timestamp, or the like. In some implementations, the information associated with the conversation can include information that identifies a speed of the user input, such as when the user input is a voice input. For example, the information can include a voice input speed, a voice input indicator start timestamp, a voice input stop timestamp, or the like.

In some implementations, the information associated with the conversation can include information that identifies a type of a user input. For example, the information can identify whether a user input is a query, a command, a request, or the like. In some implementations, the information associated with the conversation can include information that identifies a type of response to be provided by the virtual assistant 130. For example, the information can identify whether the response is the provision of information, is an action, or the like. As another example, the information can identify an expected time frame for delivering a response. For instance, the information can identify that a response should be provided in ten seconds, one minute, or the like. As another example, the information can identify a length of the response. For instance, the information can identify a number of words of the response.

In some implementations, the information associated with the conversation can include information that identifies a format of a response to be provided by the virtual assistant 130. For example, the information can identify whether the response is a text response, a voice response, an image response, or the like.

In some implementations, the information associated with the conversation can include information that identifies a language of the user input. For example, the information can identify a language of the user input, a predominant language of the user input such as when the user input includes multiple languages, or the like.

In some implementations, the information associated with the conversation can include information that identifies a user voice characteristic. For example, the information can identify frequencies of the user voice, an accent of the user voice, a volume of the user voice, an ambient noise, or the like.

In some implementations, the information associated with the conversation can include information that identifies a request by the user for the virtual assistant 130 to repeat a response. For example, the information can identify a number of response repeat requests, a number of keywords associated with response repeat requests (e.g., "what," "again," "repeat," or the like).

In some implementations, the information associated with the conversation can include information that identifies that the user cannot provide a response to the virtual assistant 130. For example, the information can identify a number of keywords (e.g., "I don't know," "I don't understand," "I don't," or the like).

In some implementations, the information associated with the conversation can include information that identifies errors of the user. For example, the information can identify a number of typing errors, a number of mispronounced words, a number of incorrect responses by the user, or the like.

In some implementations, the information associated with the conversation can include information that identifies a user sentiment. For example, the information can identify a user sentiment score, a sentiment, a number of keywords (e.g., "great," "thank you," "no," or the like), facial expressions of the user, voice characteristics of the user, a rating of the virtual assistant 130, or the like.

In some implementations, the information associated with the conversation can include information that identifies an inability of the user to understand the virtual assistant 130. For example, the information can identify a number of requests for repeated responses, a number of keywords (e.g., "I don't understand," "I can't," or the like), or the like.

In this way, the platform 120 can receive information associated with the conversation, and determine whether a channel switching condition, a language switching condition, and a configuration switching condition are respectively satisfied, as described below.

As further shown in FIG. 3 at block 320, the process 300 can include determining whether a channel switching condition for switching the conversation from a first channel to a second channel is satisfied, based on the information associated with the conversation.

The channel switching condition can refer to a condition that, if satisfied, identifies that a switch of the conversation from a first channel to a second channel would improve the conversation. For example, if the conversation is initially being conducted via a text channel, but would be better suited for a voice channel, then the channel switching condition can be satisfied. The switch of the conversation from the first channel to the second channel could improve the conversation by improving the user experience, improving user sentiment, reducing the amount of time needed for the conversation, reducing the amount of time needed to deliver a particular outcome to the user, reducing the amount of computational resources consumed by the user device 110 or the platform 120, reducing the number of repeat requests by the user, reducing the need of the user to initiate a separate conversation via another channel, or the like.

In some implementations, the platform 120 can determine that the channel switching condition is satisfied based on the information associated with the conversation and an initial channel of the conversation. For example, the platform 120 can determine whether the channel switching condition is satisfied based on a single piece of the information associated with the conversation, or based on multiple pieces of the information associated with the conversation. Additionally, the platform 120 can determine whether the channel switching condition is satisfied based on any permutation of the information associated with the conversation.

In some implementations, the platform 120 can input the information associated with the conversation into one or more artificial intelligence (AI) models, and determine whether the channel switching condition is satisfied based on an output of the one or more AI models (e.g., a behavior classifier, a language classifier, a channel classifier, a sentiment classifier, a guided channel suggester, a guided language suggester, a guided channel configurator, or the like). Additionally, the platform 120 can use an application programming interface (API) to input the various information associated with the conversation into the various one or more AI models.

With respect to block 320, in some implementations, the AI model can take user utterance as an input and classify the user's behavior into categories, such as slow typing, erroneous typing, repeat response, user sentiments, type of query, and so on, which will be discussed in greater detail below.

For instance, in some implementations, the platform 120 can train the AI model to classify the user into a category (e.g., slow typing speed, normal typing speed, etc.) based on historical data associated with the virtual assistant 130. For example, the platform 120 can extract data from historical conversations along with demographic information, such as age, native language, etc., to train the AI model. In some implementations, the platform 120 can train the AI model (e.g., a typing speed classifier) to classify a typing speed of the user based on determined input times taken by users to input text in a chat window. As another example, the platform 120 can train the AI model (e.g., a sentiment classifier) to predict a sentiment of the conversation using explicit and implicit feedback collected by the virtual assistant 130 to improve the accuracy of the AI model. As another example, the platform 120 can input text content into a spell checker or machine learning model and record the results. The platform 120 can use historical data along with demographic information to train the AI model (e.g., a typing error classifier) to determine a typing error rate. As another example, the platform 120 can train the AI model (e.g., a channel classifier) using a combination of rule-based channel classification and AI-based classification. For example, rule-based channel classification can include typing speed or typing errors that exceed a threshold which would trigger a channel switch. AI-based classification can include training a model using historical conversation data to determine the types of queries that are better suited for offline channels than online channels based on, for example, round-trip time, idle time, etc., for a specific type of query.

In some implementations, the platform 120 can determine whether the channel switching condition is satisfied based on the information that identifies the user and the initial channel of the conversation. For example, the platform 120 can determine that the channel switching condition is satisfied based on a device identifier or a model identifier of the user device 110 and an initial channel of the conversation. Continuing this example, the platform 120 can determine that the device identifier or the model identifier of the user device 110 indicates that a different channel from the initial channel might be more suitable for the conversation.

In some implementations, the platform 120 can determine whether the channel switching condition is satisfied based on the information that identifies the settings of the user and the initial channel of the conversation. For example, the platform 120 can determine that the channel switching condition is satisfied based on a preferred channel of the user being different than the initial channel of the conversation.

In some implementations, the platform 120 can determine whether the channel switching condition is satisfied based on the information that identifies the previous conversation information of the user and the initial channel of the conversation. For example, the platform 120 can determine that the channel switching condition is satisfied based on a channel that was most frequently used in previous conversations being different than the initial channel of the conversation.

In some implementations, the platform 120 can determine whether the channel switching condition is satisfied based on the information that identifies the temporal information of the conversation and the initial channel of the conversation. For example, the platform 120 can determine that the channel switching condition is satisfied based on a time of the conversation being more appropriate for a conversation in a different channel than the initial channel.

In some implementations, the platform 120 can determine whether the channel switching condition is satisfied based on the information that identifies the content of the conversation and the initial channel of the conversation. For example, the platform 120 can determine that a duration of the conversation is greater than a threshold, and determine that the channel switching condition is satisfied based on the duration being greater than the threshold.

In some implementations, the platform 120 can determine whether the channel switching condition is satisfied based on the information that identifies the typing speed of the user and the initial channel of the conversation. For example, the platform 120 can determine that a typing speed of the user is less than a threshold, and determine that the channel switching condition is satisfied based on the typing speed being less than the threshold.

In some implementations, the platform 120 can determine whether the channel switching condition is satisfied based on the information that identifies the type of the user input and/or the information that identifies the type of response and the initial channel of the conversation. For example, the platform 120 can determine that a type of response to be provided by the virtual assistant 130 is more appropriate for a different channel than the initial channel, and determine that the channel switching condition is satisfied, In some implementations, the platform 120 can determine whether the channel switching condition is satisfied based on the information that identifies the format of the response to be provided by the virtual assistant 130 and the initial channel of the conversation. For example, the platform 120 can determine that a format of the response to be provided by the virtual assistant 130 is more appropriate for a different channel than the initial channel, and determine that the channel switching condition is satisfied.

In some implementations, the platform 120 can determine whether the channel switching condition is satisfied based on the information that identifies a language of the user input and the initial channel. For example, the platform 120 can determine that a language of the user input is more appropriate for a different channel than the initial channel, and determine that the channel switching condition is satisfied.

In some implementations, the platform 120 can determine whether the channel switching condition is satisfied based on the information that identifies the user voice characteristic and the initial channel of the conversation. For example, the platform 120 can determine that an ambient noise is greater than a threshold, and determine that the channel switching condition is satisfied based on the ambient noise being greater than the threshold.

In some implementations, the platform 120 can determine whether the channel switching condition is satisfied based on the information that identifies a request by the user for the virtual assistant 130 to repeat a response. For example, the platform 120 can determine that a number of response repeat requests is greater than a threshold, and determine that the channel switching condition is satisfied based on the number of response repeat requests being greater than the threshold.

In some implementations, the platform 120 can determine whether the channel switching condition is satisfied based on the information that identifies that the user cannot provide a response to the virtual assistant 130. For example, the platform 120 can determine that a number of keywords indicative of the user not being able to provide a response to the virtual assistant 130 is greater than a threshold, and determine that the channel switching condition is satisfied based on the number of keywords being greater than the threshold.

In some implementations, the platform 120 can determine whether the channel switching condition is satisfied based on the information that identifies the errors of the user. For example, the platform 120 can determine that a number of typing errors of the user is greater than a threshold, and determine that the channel switching condition is satisfied based on the number of errors being greater than the threshold.

In some implementations, the platform 120 can determine whether the channel switching condition is satisfied based on the information that identifies the user sentiment. For example, the platform 120 can determine that a user sentiment score is less than a threshold, and determine that the channel switching condition is satisfied based on the user sentiment score being less than the threshold.

In some implementations, the platform 120 can determine whether the channel switching condition is satisfied based on the information that identifies an inability of the user to understand the virtual assistant 130. For example, the platform 120 can determine that a number of keywords indicative of an inability of the user to understand the virtual assistant 130 is greater than a threshold, and determine that the channel switching condition is satisfied based on the number of keywords being greater than the threshold.

Based on determining that the channel switching condition is satisfied, the platform 120 can determine a channel to which to switch the conversation.

As further shown in FIG. 3 at block 330, the process 300 can include determining whether a language switching condition for switching the conversation from a first language to a second language is satisfied, based on the information associated with the conversation.

The language switching condition can refer to a condition that, if satisfied, identifies that a switch of the conversation from a first language to a second language would improve the conversation. For example, if the conversation is initially being conducted via English, but would be better suited if conducted in Spanish, then the channel switching condition can be satisfied. The switch of the conversation from the first language to the second language could improve the conversation by improving the user experience, improving user sentiment, reducing the amount of time needed for the conversation, reducing the amount of time needed to deliver a particular outcome to the user, reducing the amount of computational resources consumed by the user device 110 or the platform 120, reducing the number of repeat requests by the user, reducing the need of the user to initiate a separate conversation, or the like.

In some implementations, the platform 120 can input the information associated with the conversation into an AI model, and determine whether the language switching condition is satisfied based on an output of the AI model. With respect to block 330, in some implementations, the AI model can take user utterance as an input and determine whether the user would be comfortable conversing in the current (initial) language or in a different language.

In some implementations, the platform 120 can determine whether the language switching condition is satisfied based on the information that identifies the user and the initial language of the conversation. For example, the platform 120 can determine that the language switching condition is satisfied based on a device identifier or a model identifier of the user device 110 and an initial language of the conversation. Continuing this example, the platform 120 can determine that the device identifier or the model identifier of the user device 110 indicates that a different language from the initial language might be more suitable for the conversation.

In some implementations, the platform 120 can determine whether the language switching condition is satisfied based on the information that identifies the settings of the user and the initial language of the conversation. For example, the platform 120 can determine that the language switching condition is satisfied based on a preferred language of the user being different than the initial language of the conversation.

In some implementations, the platform 120 can determine whether the language switching condition is satisfied based on the information that identifies the previous conversation information of the user and the initial language of the conversation. For example, the platform 120 can determine that the language switching condition is satisfied based on a language that was most frequently used in previous conversations being different than the initial language of the conversation.

In some implementations, the platform 120 can determine whether the channel switching condition is satisfied based on the information that identifies the temporal information of the conversation and the initial language of the conversation. For example, the platform 120 can determine that the channel switching condition is satisfied based on a time of the conversation being more appropriate for a conversation in a different language than the initial language. As an example, a particular conversation being conducted a particular time might indicate that the user is located in a country associated with a time zone corresponding to the particular time.

In some implementations, the platform 120 can determine whether the language switching condition is satisfied based on the information that identifies the content of the conversation and the initial language of the conversation. For example, the platform 120 can determine that a duration of the conversation is greater than a threshold, and determine that the language switching condition is satisfied based on the duration being greater than the threshold.

In some implementations, the platform 120 can determine whether the language switching condition is satisfied based on the information that identifies a language of the user input and the initial language of the conversation. For example, the platform 120 can determine that a language of the user input is different than the initial language of the conversation, and determine that the language switching condition is satisfied.

In some implementations, the platform 120 can determine whether the language switching condition is satisfied based on the information that identifies a request by the user for the virtual assistant 130 to repeat a response. For example, the platform 120 can determine that a number of response repeat requests is greater than a threshold, and determine that the language switching condition is satisfied based on the number of response repeat requests being greater than the threshold.

In some implementations, the platform 120 can determine whether the language switching condition is satisfied based on the information that identifies that the user cannot provide a response to the virtual assistant 130. For example, the platform 120 can determine that a number of keywords indicative of the user not being able to provide a response to the virtual assistant 130 is greater than a threshold, and determine that the language switching condition is satisfied based on the number of keywords being greater than the threshold.

In some implementations, the platform 120 can determine whether the language switching condition is satisfied based on the information that identifies the errors of the user. For example, the platform 120 can determine that a number of typing errors of the user is greater than a threshold, and determine that the language switching condition is satisfied based on the number of errors being greater than the threshold.

In some implementations, the platform 120 can determine whether the language switching condition is satisfied based on the information that identifies the user sentiment. For example, the platform 120 can determine that a user sentiment score is less than a threshold, and determine that the language switching condition is satisfied based on the user sentiment score being less than the threshold.

In some implementations, the platform 120 can determine whether the language switching condition is satisfied based on the information that identifies an inability of the user to understand the virtual assistant 130. For example, the platform 120 can determine that a number of keywords indicative of an inability of the user to understand the virtual assistant 130 is greater than a threshold, and determine that the channel switching condition is satisfied based on the number of keywords being greater than the threshold.

Based on determining that the language switching condition is satisfied, the platform 120 can determine a language to which to switch the conversation.

As further shown in FIG. 3 at block 340, the process 300 can include determining whether a configuration switching condition for switching a first configuration of the virtual assistant to a second configuration of the virtual assistant is satisfied, based on the information associated with the conversation.

The configuration switching condition can refer to a condition that, if satisfied, identifies that a switch of the conversation from a first configuration of the virtual assistant 130 to a second configuration of the virtual assistant 130 would improve the conversation. For example, if a talking speed of the virtual assistant 130 is initially relatively fast, but would be better suited for the user if reduced, then the configuration switching condition can be satisfied. The switch of the conversation from the first configuration of the virtual assistant 130 to the second configuration of the virtual assistant 130 could improve the conversation by improving the user experience, improving user sentiment, reducing the amount of time needed for the conversation, reducing the amount of time needed to deliver a particular outcome to the user, reducing the amount of computational resources consumed by the user device 110 or the platform 120, reducing the number of repeat requests by the user, reducing the need of the user to initiate a separate conversation using a different configuration, or the like.

In some implementations, the platform 120 can determine that the configuration switching condition is satisfied based on the information associated with the conversation and an initial configuration of the virtual assistant 130. For example, the platform 120 can determine whether the configuration switching condition is satisfied based on a single piece of the information associated with the conversation, or based on multiple pieces of the information associated with the conversation. Additionally, the platform 120 can determine whether the configuration switching condition is satisfied based on any permutation of the information associated with the conversation.

In some implementations, the platform 120 can input the information associated with the conversation into an AI model, and determine whether the configuration switching condition is satisfied based on an output of the AI model. With respect to block 340, in some implementations, the AI model can take user behavior (e.g., slow typing, erroneous typing, demographics, etc.) as an input and determine the best channel to continue the conversation.

In some implementations, the platform 120 can determine whether the configuration switching condition is satisfied based on the information that identifies the user and the initial configuration of the conversation. For example, the platform 120 can determine that the configuration switching condition is satisfied based on a device identifier or a model identifier of the user device 110 and an initial configuration of the conversation. Continuing this example, the platform 120 can determine that the device identifier or the model identifier of the user device 110 indicates that a different configuration from the initial channel might be more suitable for the conversation.

In some implementations, the platform 120 can determine whether the configuration switching condition is satisfied based on the information that identifies the settings of the user and the initial configuration of the conversation. For example, the platform 120 can determine that the configuration switching condition is satisfied based on a preferred configuration of the user being different than the initial configuration of the virtual assistant 130.

In some implementations, the platform 120 can determine whether the configuration switching condition is satisfied based on the information that identifies the previous conversation information of the user and the initial configuration of the conversation. For example, the platform 120 can determine that the configuration switching condition is satisfied based on a configuration that was most frequently used in previous conversations being different than the initial configuration of the virtual assistant 130.

In some implementations, the platform 120 can determine whether the configuration switching condition is satisfied based on the information that identifies the temporal information of the conversation and the initial channel of the conversation. For example, the platform 120 can determine that the channel switching condition is satisfied based on a time of the conversation being more appropriate for a conversation in a different configuration than the initial configuration.

In some implementations, the platform 120 can determine whether the configuration switching condition is satisfied based on the information that identifies the content of the conversation and the initial configuration of the virtual assistant 130. For example, the platform 120 can determine that a duration of the conversation is greater than a threshold, and determine that the configuration switching condition is satisfied based on the duration being greater than the threshold.

In some implementations, the platform 120 can determine whether the configuration switching condition is satisfied based on the information that identifies the typing speed of the user and the initial configuration of the virtual assistant 130. For example, the platform 120 can determine that a typing speed of the user is less than a threshold, and determine that the configuration switching condition is satisfied based on the typing speed being less than the threshold.

In some implementations, the platform 120 can determine whether the configuration switching condition is satisfied based on the information that identifies the type of the user input and/or the information that identifies the type of response and the initial configuration of the conversation. For example, the platform 120 can determine that a type of response to be provided by the virtual assistant 130 is more appropriate for a different configuration than the initial configuration, and determine that the channel configuration condition is satisfied, In some implementations, the platform 120 can determine whether the configuration switching condition is satisfied based on the information that identifies the format of the response to be provided by the virtual assistant 130 and the initial configuration of the virtual assistant 130. For example, the platform 120 can determine that a format of the response to be provided by the virtual assistant 130 is more appropriate for a different configuration than the initial configuration, and determine that the configuration switching condition is satisfied.

In some implementations, the platform 120 can determine whether the configuration switching condition is satisfied based on the information that identifies a language of the user input and the initial configuration. For example, the platform 120 can determine that a language of the user input is more appropriate for a different configuration than the initial configuration of the virtual assistant 130, and determine that the configuration switching condition is satisfied.

In some implementations, the platform 120 can determine whether the configuration switching condition is satisfied based on the information that identifies the user voice characteristic and the initial configuration of the virtual assistant 130. For example, the platform 120 can determine that an ambient noise is greater than a threshold, and determine that the configuration switching condition is satisfied based on the ambient noise being greater than the threshold.

In some implementations, the platform 120 can determine whether the configuration switching condition is satisfied based on the information that identifies a request by the user for the virtual assistant 130 to repeat a response. For example, the platform 120 can determine that a number of response repeat requests is greater than a threshold, and determine that the configuration switching condition is satisfied based on the number of response repeat requests being greater than the threshold.

In some implementations, the platform 120 can determine whether the configuration switching condition is satisfied based on the information that identifies that the user cannot provide a response to the virtual assistant 130. For example, the platform 120 can determine that a number of keywords indicative of the user not being able to provide a response to the virtual assistant 130 is greater than a threshold, and determine that the configuration switching condition is satisfied based on the number of keywords being greater than the threshold.

In some implementations, the platform 120 can determine whether the configuration switching condition is satisfied based on the information that identifies the errors of the user. For example, the platform 120 can determine that a number of typing errors of the user is greater than a threshold, and determine that the configuration switching condition is satisfied based on the number of errors being greater than the threshold.

In some implementations, the platform 120 can determine whether the configuration switching condition is satisfied based on the information that identifies the user sentiment. For example, the platform 120 can determine that a user sentiment score is less than a threshold, and determine that the configuration switching condition is satisfied based on the user sentiment score being less than the threshold.

In some implementations, the platform 120 can determine whether the configuration switching condition is satisfied based on the information that identifies an inability of the user to understand the virtual assistant 130. For example, the platform 120 can determine that a number of keywords indicative of an inability of the user to understand the virtual assistant 130 is greater than a threshold, and determine that the configuration switching condition is satisfied based on the number of keywords being greater than the threshold.

Based on determining that the configuration switching condition is satisfied, the platform 120 can determine a configuration to which to switch the virtual assistant 130.

As further shown in FIG. 3 at block 350, the process 300 can include performing an action based on at least one of determining whether the channel switching condition is satisfied, determining whether the language switching condition is satisfied, and determining whether the configuration switching condition is satisfied.

The platform 120 can perform an action based on at least one of determining whether the channel switching condition is satisfied, determining whether the language switching condition is satisfied, and determining whether the configuration switching condition is satisfied. In some implementations, the action can be suggesting a different channel, suggesting a different language, or suggesting a different configuration. Alternatively, the action can be automatically switching the channel, automatically switching the language, or automatically switching the configuration. Alternatively, the action can be automatically initiating a new conversation on a different user device 110, automatically initiating a new conversation in a different channel, automatically initiating a new conversation in a different language, or automatically initiating a new conversation in a different configuration.

Figure 4:
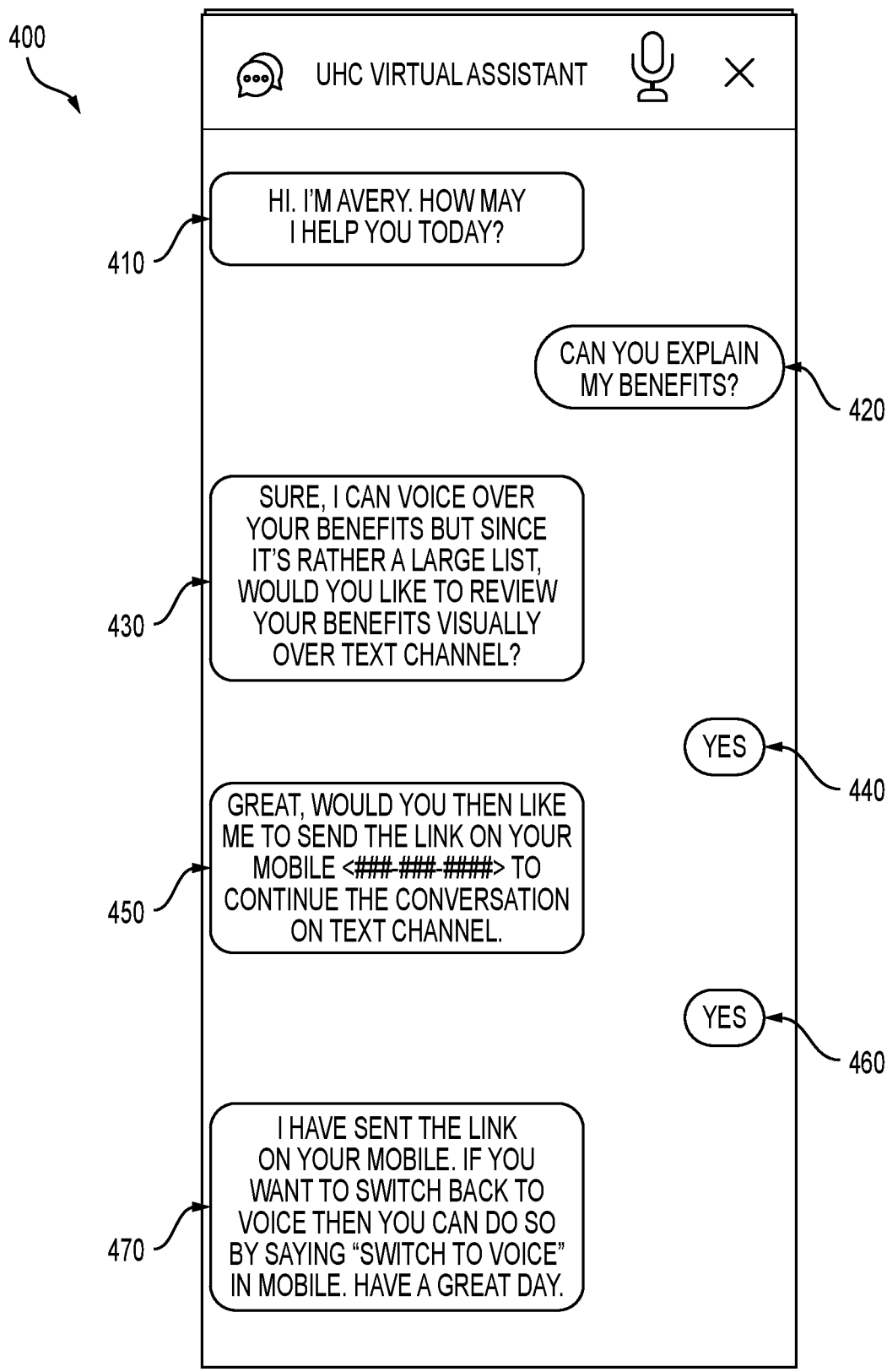
FIG. 4 is a diagram of an example conversation between a user and a virtual assistant in which the virtual assistant provides a recommendation to switch from a voice channel to a text channel, in accordance with some embodiments of the present disclosure.

FIG. 4 is a diagram 400 of an example conversation between a user and a virtual assistant in which the virtual assistant provides a recommendation to switch from a voice channel to a text channel.

In FIG. 4, a user can initially conduct a conversation with a web-based virtual assistant 130 via a voice channel. For instance, as shown, the virtual assistant 130 can provide an output 410 that introduces the virtual assistant 130 to a user. The user can provide a user input 420 requesting the virtual assistant 130 to provide information to the user. Based on the requested information, the platform 120 can determine a length of a response of the virtual assistant 130. In this case, the platform 120 can determine that the length is greater than a threshold, and determine that a channel switching condition is satisfied based on the length being greater than the threshold. The virtual assistant 130 can provide an output 430 indicating that the response is more appropriate for a text channel via short message service (SMS), and that suggests a switch of the channel to the user. In response, the user can provide user input 440 that agrees to the switch of the channel. The virtual assistant 130 can provide output 450 that indicates that the channel is being switched. The user can provide user input 460 confirming that the channel is being switched. The virtual assistant 130 can provide output 470 identifying that the channel has been switched.

Figure 5:
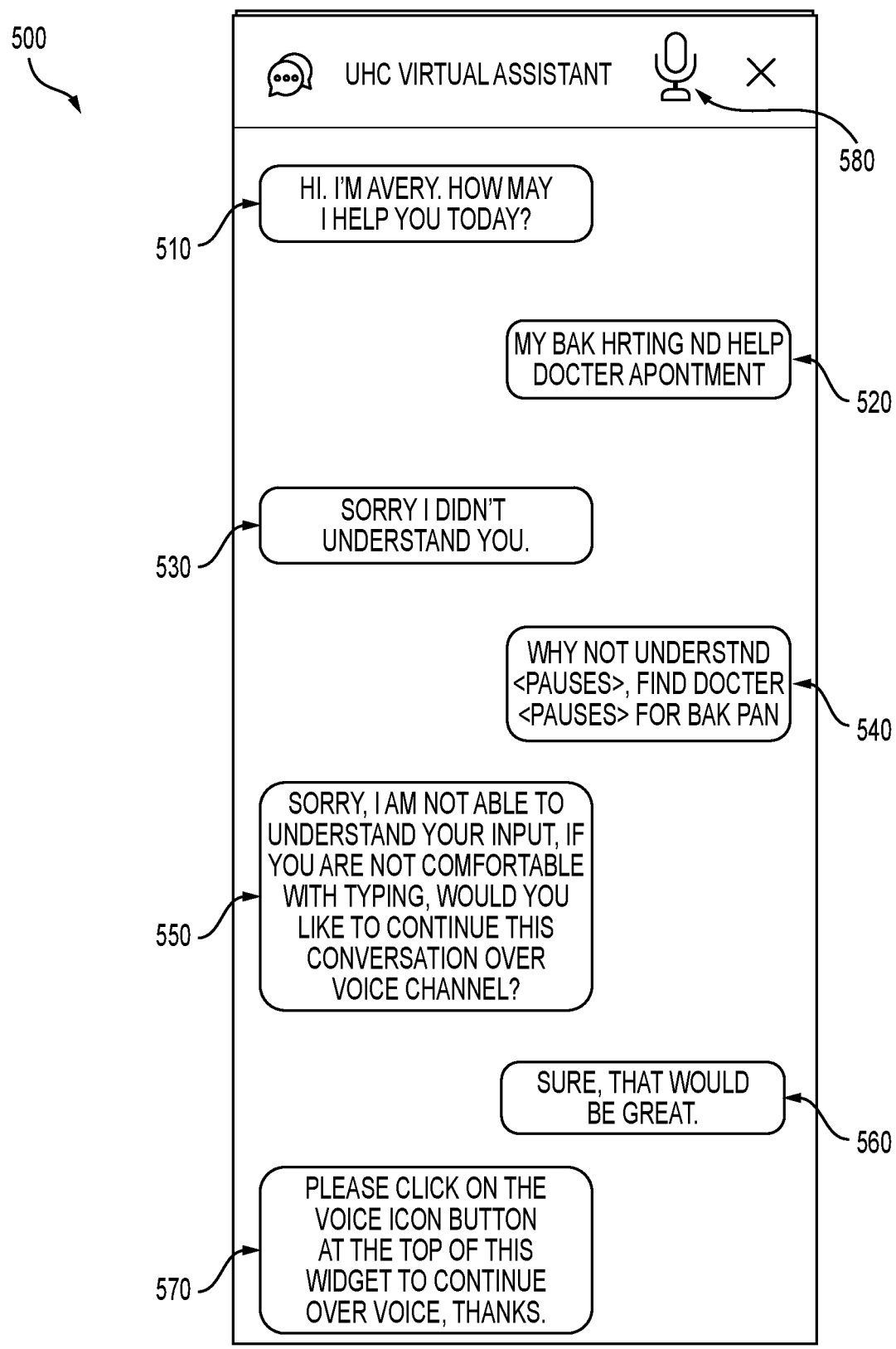
FIG. 5 is a diagram of an example conversation between a user and a virtual assistant in which the virtual assistant provides a recommendation to switch from a text channel to a voice channel, in accordance with some embodiments of the present disclosure.

FIG. 5 is a diagram 500 of an example conversation between a user and a virtual assistant in which the virtual assistant provides a recommendation to switch from a text channel to a voice channel.

In FIG. 5, a user can initially conduct a conversation with a web-based virtual assistant 130 via a text channel. For instance, as shown, the virtual assistant 130 can provide an output 510 that introduces the virtual assistant 130 to a user. The user can provide a user input 520 requesting the virtual assistant 130 to assist the user. As shown, the user input 520 includes various typographical errors. The virtual assistant 130 can provide output 530 indicating that the virtual assistant 130 is unable to understand the user input 520. The user provides user input 540 reiterating the request to assist the user. As shown, the user input 540 includes various typographical errors. Based on the typing errors included in the user inputs 520 and 540 and/or based on the virtual assistant 130 being unable to understand the user, the virtual assistant 130 can determine that a channel switching condition is satisfied. The virtual assistant 130 can provide output 550 indicating that the conversation is more appropriate for a voice channel, and that suggests a switch to a voice channel. The user provides user input 560 agreeing to the switch to the voice channel. The virtual assistant 130 provides output 570 indicating that the user can interact with icon 580 to complete the switch to the voice channel.

Figure 6:
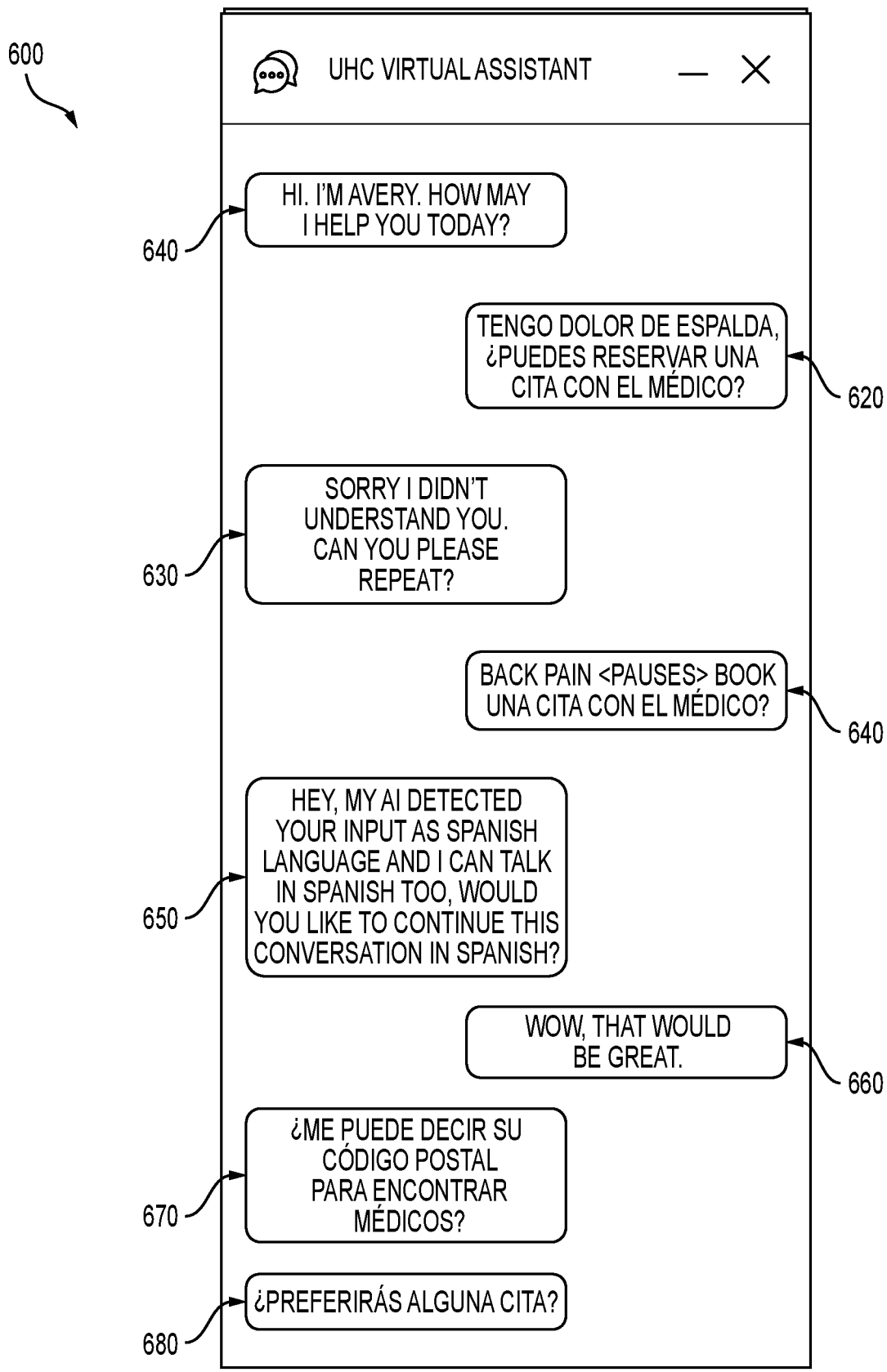
FIG. 6 is a diagram of an example conversation between a user and a virtual assistant in which the virtual assistant provides a recommendation to switch from a first language to a second language, in accordance with some embodiments of the present disclosure.

FIG. 6 is a diagram 600 of an example conversation between a user and a virtual assistant in which the virtual assistant provides a recommendation to switch from a first language to a second language.

In FIG. 6, a user can conduct a conversation with a web-based virtual assistant 130 via a text channel. For instance, as shown, the virtual assistant 130 can provide an output 510 in English that introduces the virtual assistant 130 to a user. The user provides user input 620 in Spanish requesting an action by the virtual assistant 130. The virtual assistant 130 provides output 630 indicating that the virtual assistant 130 did not understand the user input 620. The user provides user input 640 reiterating the user request. Based on the user inputs 620 and 640, the platform 120 determines that a language of the user inputs 620 and 640 is different than a language of the virtual assistant 130, and determines that a language switching condition is satisfied. The virtual assistant 130 provides output 650 indicating that the virtual assistant 130 can switch the language to Spanish. The user provides input 660 agreeing to the language switch. In turn, the virtual assistant 130 provides subsequent outputs 670 and 680 in Spanish.

In this way, some embodiments herein provide systems and methods that receive information associated with a conversation involving a virtual assistant, and selectively adjust a channel of the conversation, a language of the conversation, and/or a configuration of the virtual assistant based on whether respective switching conditions are satisfied.

The switching could improve the conversation by improving the user experience, improving user sentiment, reducing the amount of time needed for the conversation, reducing the amount of time needed to deliver a particular outcome to the user, reducing the amount of computational resources consumed by the user device or the platform, reducing the number of repeat requests by the user, reducing the need of the user to initiate a separate conversation, or the like. Accordingly, some embodiments herein improve the technical field associated with virtual assistants and improve computing devices associated with implementing virtual assistants by providing more efficient and more effective virtual assistants.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention are practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications are made thereto without departing from the spirit of the invention, and it is intended to claim all such changes and modifications as falling within the scope of the invention. For example, any formulas given above are merely representative of procedures that can be used. Functionality can be added or deleted from the block diagrams and operations can be interchanged among functional blocks. Steps can be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

The present disclosure furthermore relates to the following aspects.

Example 1. A computer-implemented method for dynamically customizing a virtual assistant, the method comprising: receiving, by one or more processors, information associated with a conversation involving the virtual assistant; determining, by the one or more processors, whether a channel switching condition for switching the conversation from a first channel to a second channel is satisfied, based on the information associated with the conversation; determining, by the one or more processors, whether a language switching condition for switching the conversation from a first language to a second language is satisfied, based on the information associated with the conversation; determining, by the one or more processors, whether a configuration switching condition for switching a first configuration of the virtual assistant to a second configuration of the virtual assistant is satisfied, based on the information associated with the conversation; and performing an action based on at least one of determining whether the channel switching condition is satisfied, determining whether the language switching condition is satisfied, or determining whether the configuration switching condition is satisfied.

Example 2. The computer-implemented method of Example 1, wherein the information associated with the conversation includes demographic information of a user, and wherein the determining whether the channel switching condition is satisfied is based on the demographic information of the user.

Example 3. The computer-implemented method of any of the preceding examples, wherein the information associated with the conversation includes a number of typing errors of a user, and wherein the determining whether the channel switching condition is satisfied is based on the number of typing errors of the user.

Example 4. The computer-implemented method of any of the preceding examples, wherein the information associated with the conversation includes a typing speed of a user, and wherein the determining whether the channel switching condition is satisfied is based on the typing speed of the user.

Example 5. The computer-implemented method of any of the preceding examples, wherein the information associated with the conversation includes a number of response repeat requests of a user, and wherein the determining whether the channel switching condition is satisfied is based on the number of response repeat requests of the user.

Example 6. The computer-implemented method of any of the preceding examples, wherein the information associated with the conversation includes a sentiment score of a user, and wherein the determining whether the channel switching condition is satisfied is based on the sentiment score of the user.

Example 7. The computer-implemented method of any of the preceding examples, wherein the information associated with the conversation includes a language of a user, and wherein the determining whether the language switching condition is satisfied is based on the language of the user.

Example 8. A system for dynamically customizing a virtual assistant, the system comprising: one or more storage devices each configured to store instructions; and one or more processors configured to execute the instructions to perform operations comprising: receiving information associated with a conversation involving a virtual assistant; determining whether a channel switching condition for switching the conversation from a first channel to a second channel is satisfied, based on the information associated with the conversation; determining whether a language switching condition for switching the conversation from a first language to a second language is satisfied, based on the information associated with the conversation; determining whether a configuration switching condition for switching a first configuration of the virtual assistant to a second configuration of the virtual assistant is satisfied, based on the information associated with the conversation; and performing an action based on at least one of: determining whether the channel switching condition is satisfied, determining whether the language switching condition is satisfied, or determining whether the configuration switching condition is satisfied.

Example 9. The system of example 8, wherein the information associated with the conversation includes demographic information of a user, and wherein the determining whether the channel switching condition is satisfied is based on the demographic information of the user.

Example 10. The system of any of Examples 8-9, wherein the information associated with the conversation includes a number of typing errors of a user, and wherein the determining whether the channel switching condition is satisfied is based on the number of typing errors of the user.

Example 11. The system of any of Examples 8-10, wherein the information associated with the conversation includes a typing speed of a user, and wherein the determining whether the channel switching condition is satisfied is based on the typing speed of the user.

Example 12. The system of any of Examples 8-11, wherein the information associated with the conversation includes a number of response repeat requests of a user, and wherein the determining whether the channel switching condition is satisfied is based on the number of response repeat requests of the user.

Example 13. The system of any of Examples 8-12, wherein the information associated with the conversation includes a sentiment score of a user, and wherein the determining whether the channel switching condition is satisfied is based on the sentiment score of the user.

Example 14. The system of any of Examples 8-13, wherein the information associated with the conversation includes a language of a user, and wherein the determining whether the language switching condition is satisfied is based on the language of the user.

Example 15. A non-transitory computer-readable medium comprising instructions that, when executed by one or more processors, cause the one or more processors to perform operations for dynamically customizing a virtual assistant, the operations comprising: receiving information associated with a conversation involving the virtual assistant; determining whether a channel switching condition for switching the conversation from a first channel to a second channel is satisfied, based on the information associated with the conversation; determining whether a language switching condition for switching the conversation from a first language to a second language is satisfied, based on the information associated with the conversation; determining whether a configuration switching condition for switching a first configuration of the virtual assistant to a second configuration of the virtual assistant is satisfied, based on the information associated with the conversation; and performing an action based on at least one of determining whether the channel switching condition is satisfied, determining whether the language switching condition is satisfied, or determining whether the configuration switching condition is satisfied.

Example 16. The non-transitory computer-readable medium of Example 15, wherein the information associated with the conversation includes demographic information of a user, and wherein the determining whether the channel switching condition is satisfied is based on the demographic information of the user.

Example 17. The non-transitory computer-readable medium of any of Examples 15-16, wherein the information associated with the conversation includes a number of typing errors of a user, and wherein the determining whether the channel switching condition is satisfied is based on the number of typing errors of the user.

Example 18. The non-transitory computer-readable medium of any of Examples 15-17, wherein the information associated with the conversation includes a typing speed of a user, and wherein the determining whether the channel switching condition is satisfied is based on the typing speed of the user.

Example 19. The non-transitory computer-readable medium of any of Examples 15-18, wherein the information associated with the conversation includes a number of response repeat requests of a user, and wherein the determining whether the channel switching condition is satisfied is based on the number of response repeat requests of the user.

Example 20. The non-transitory computer-readable medium of any of Examples 15-19, wherein the information associated with the conversation includes a sentiment score of a user, and wherein the determining whether the channel switching condition is satisfied is based on the sentiment score of the user.

We claim:

1. A computer-implemented method for dynamically customizing a virtual assistant, the computer-implemented method comprising:
   receiving, by one or more processors, information associated with a conversation involving the virtual assistant, the information including an expected time frame of a response to be provided by the virtual assistant;
   determining, by the one or more processors, that a channel switching condition for switching the conversation from a first channel to a second channel is satisfied based on the expected time frame of the response; and
   sending, by the one or more processors, the response via the second channel based on determining that the channel switching condition is satisfied.

2. The computer-implemented method of claim 1, further comprising:
   determining, by the one or more processors, that a language switching condition for switching the conversation from a first language to a second language is satisfied based on the information,
   wherein the response is sent in the second language based on determining that the language switching condition is satisfied.

3. The computer-implemented method of claim 1, further comprising:
   determining, by the one or more processors, that a configuration switching condition for switching a first configuration of the virtual assistant to a second configuration of the virtual assistant is satisfied based on the information,
   wherein the response is sent using the second configuration based on determining that the configuration switching condition is satisfied.

4. The computer-implemented method of claim 1, wherein the information includes a typing speed of a user, and wherein determining that the channel switching condition is satisfied is further based on the typing speed of the user.

5. The computer-implemented method of claim 1, wherein the information includes a number of response repeat requests of a user, and wherein determining that the channel switching condition is satisfied is further based on the number of response repeat requests of the user.

6. The computer-implemented method of claim 1, wherein the information includes a sentiment score of a user, and wherein determining that the channel switching condition is satisfied is further based on the sentiment score of the user.

7. The computer-implemented method of claim 2, wherein the information includes a language of a user, and wherein determining that the language switching condition is satisfied is based on the language of the user.

8. A system for dynamically customizing a virtual assistant, the system comprising:
   one or more storage devices each configured to store instructions; and
   one or more processors configured to execute the instructions to perform operations comprising:
      receiving information associated with a conversation involving the virtual assistant, the information including an expected time frame of a response to be provided by the virtual assistant;
      determining that a channel switching condition for switching the conversation from a first channel to a second channel is satisfied based on the expected time frame of the response; and
      sending the response via the second channel based on determining that the channel switching condition is satisfied.

9. The system of claim 8, wherein the operations further comprise:
   determining that a language switching condition for switching the conversation from a first language to a second language is satisfied based on the information,
   wherein the response is sent in the second language based on determining that the language switching condition is satisfied.

10. The system of claim 8, wherein the operations further comprise:
    determining that a configuration switching condition for switching a first configuration of the virtual assistant to a second configuration of the virtual assistant is satisfied based on the information,
    wherein the response is sent using the second configuration based on determining that the configuration switching condition is satisfied.

11. The system of claim 8, wherein the information includes a typing speed of a user, and wherein determining that the channel switching condition is satisfied is further based on the typing speed of the user.

12. The system of claim 8, wherein the information includes a number of response repeat requests of a user, and wherein determining that the channel switching condition is satisfied is further based on the number of response repeat requests of the user.

13. The system of claim 8, wherein the information includes a sentiment score of a user, and wherein determining that the channel switching condition is satisfied is further based on the sentiment score of the user.

14. The system of claim 9, wherein the information includes a language of a user, and wherein determining that the language switching condition is satisfied is based on the language of the user.

15. One or more non-transitory computer-readable media comprising instructions that, when executed by one or more processors, cause the one or more processors to perform operations for dynamically customizing a virtual assistant, the operations comprising:
    receiving information associated with a conversation involving the virtual assistant, the information including an expected time frame of a response to be provided by the virtual assistant;
    determining that a channel switching condition for switching the conversation from a first channel to a second channel is satisfied based on the expected time frame of the response, the length of the response; and
    sending the response via the second channel based on determining that the channel switching condition is satisfied.

16. The one or more non-transitory computer-readable media of claim 15, wherein the operations further comprise:

determining that a language switching condition for switching the conversation from a first language to a second language is satisfied based on the information, wherein the response is sent in the second language based on determining that the language switching condition is satisfied.

17. The one or more non-transitory computer-readable media of claim 15, wherein the operations further comprise:

determining that a configuration switching condition for switching a first configuration of the virtual assistant to a second configuration of the virtual assistant is satisfied based on the information, wherein the response is sent using the second configuration based on determining that the configuration switching condition is satisfied.

18. The one or more non-transitory computer-readable media of claim 15, wherein the information includes a typing speed of a user, and wherein determining that the channel switching condition is satisfied is further based on the typing speed of the user.

19. The one or more non-transitory computer-readable media of claim 15, wherein the information includes a number of response repeat requests of a user, and wherein determining that the channel switching condition is satisfied is further based on the number of response repeat requests of the user.

20. The one or more non-transitory computer-readable media of claim 15, wherein the information includes a sentiment score of a user, and wherein determining that the channel switching condition is satisfied is further based on the sentiment score of the user.

* * * * *

UNITED STATES PATENT AND TRADEMARK OFFICE
CERTIFICATE OF CORRECTION

| | | |
|---|---|---|
| PATENT NO. | : 12,047,336 B1 | Page 1 of 1 |
| APPLICATION NO. | : 18/302175 | |
| DATED | : July 23, 2024 | |
| INVENTOR(S) | : Nand Kishor and Tiasa Mukherjee | |

It is certified that error appears in the above-identified patent and that said Letters Patent is hereby corrected as shown below:

In the Claims

In Column 22, Line 62, delete ", the length of the response"

Signed and Sealed this
Nineteenth Day of November, 2024

*Katherine Kelly Vidal*

Katherine Kelly Vidal
*Director of the United States Patent and Trademark Office*